United States Patent [19]
Lohr

[11] Patent Number: 5,419,421
[45] Date of Patent: May 30, 1995

[54] QUIET-RUNNING CENTRIFUGAL CLUTCH

[75] Inventor: Thomas H. Lohr, Richmond, Ind.

[73] Assignee: Hoffco, Inc., Richmond, Ind.

[21] Appl. No.: 97,531

[22] Filed: Jul. 27, 1993

[51] Int. Cl.6 .................. F16D 13/16; F16D 43/18
[52] U.S. Cl. ..................... 192/105 BA; 192/30 V; 192/37; 192/109 A
[58] Field of Search .............. 192/105 BA, 105 BB, 192/30 V, 76, 37, 109 A

[56] References Cited

U.S. PATENT DOCUMENTS

| | | | |
|---|---|---|---|
| 2,616,274 | 11/1952 | Landrum | 192/105 BB X |
| 2,730,219 | 1/1956 | Kitto | 192/105 BA |
| 2,754,948 | 7/1956 | Pohl | 192/105 BA |
| 2,947,399 | 8/1960 | Moore et al. | 192/105 BA |
| 3,204,737 | 9/1965 | Anner | 192/105 BA |
| 3,477,555 | 11/1969 | Hazzard | 192/105 BA X |
| 3,677,380 | 7/1972 | Kirschey | 192/105 BA |
| 3,971,463 | 7/1976 | Zindler | 192/105 BA |
| 4,282,962 | 8/1981 | St. John | 192/30 V X |
| 4,610,343 | 9/1986 | Hikari | 192/105 BA |

OTHER PUBLICATIONS

"Automatic Centrifugal Clutches" Literature, Lit. No. 160924, Date: REV.5-88 (four pages) Contained in Superior Power Equipment Components . . . , Coment Industries Sales Catalog; May, 1988.

Primary Examiner—Rodney H. Bonck
Attorney, Agent, or Firm—Barnes & Thornburg

[57] ABSTRACT

A centrifugal clutch includes a pair of clutch shoes and a rotor. The rotor includes rotor arms extending into pockets formed in the clutch shoes. Sound-deadening buffer members are positioned in the pockets to lie between each rotor arm and clutch shoe to deaden sound produced by movement of a rotor arm in its clutch shoe pocket.

54 Claims, 3 Drawing Sheets

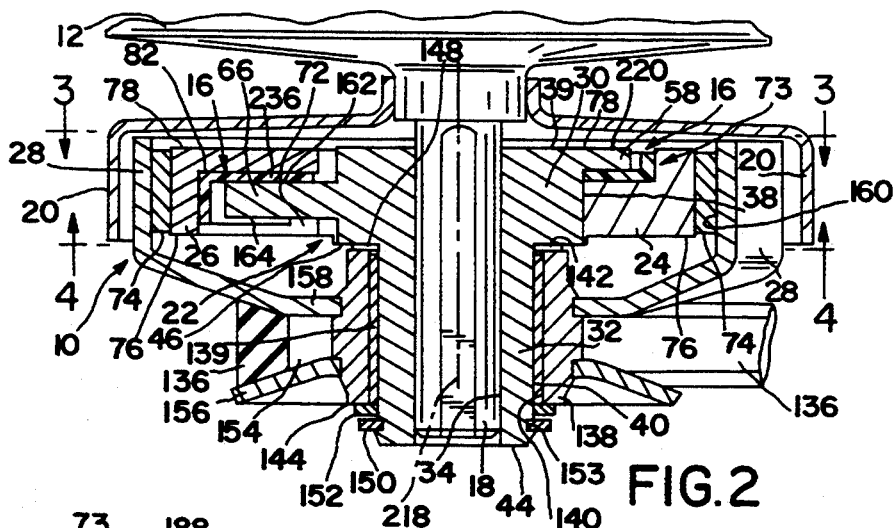
FIG.2
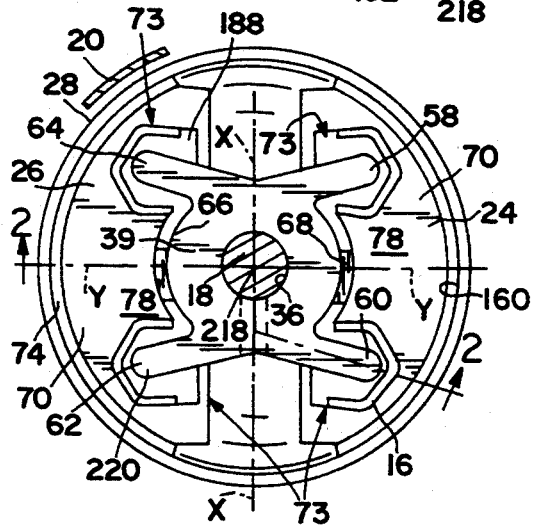
FIG.3
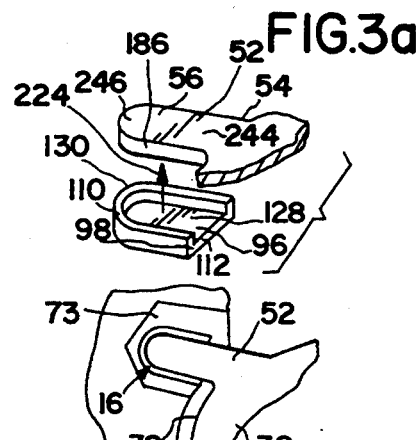
FIG.3a
FIG.3b
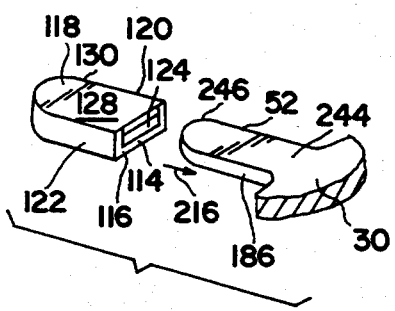
FIG.3c
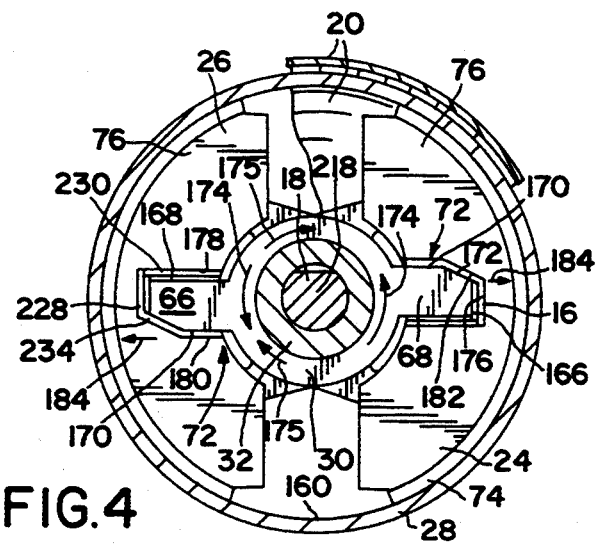
FIG.4

QUIET-RUNNING CENTRIFUGAL CLUTCH

BACKGROUND AND SUMMARY OF THE INVENTION

The present invention relates to centrifugal clutches, and particularly, to noise-attenuation systems for quieting running noises produced during operation of centrifugal clutches. More particularly, the present invention relates to centrifugal clutches outfitted with sound-deadening pads.

Clutches are used in a variety of mechanical systems to transmit torque from a motor to a driven part (e.g., drive belt or chain) of a mechanism. A clutch is a coupling used to connect and disconnect a driving and a driven part of a mechanism. A wide variety of clutches are known. A positive contact clutch transmits power from a driving shaft to a driven shaft by means of jaws or teeth. A disc clutch is able to transmit torque from an input shaft to an output shaft because of the frictional force developed between two plates or discs. A cone clutch is another type of axial friction clutch in which a cone fits in a cup. Electric clutches, hydraulic or pneumatic clutches, and overrunning clutches are also used to produce torque transmission.

A centrifugal clutch is designed to "engage" and transmit torque from an input shaft to an output shaft whenever some minimum rotational speed has been exceeded. It has been observed that conventional centrifugal clutches produce a lot of clicking and clattering sounds during operation due to engagement of the rotating clutch components. In some environments, excessive noise can be a problem. For example, consumers are unhappy if the clutch included in an appliance used in the home is noisy during operation. Although some electric clutches operate quietly, they are expensive and include a lot of components.

What is needed is a quiet-running centrifugal clutch that is operable to transmit power from an input shaft to an output shaft quietly and effectively. Such a centrifugal clutch would provide a suitable replacement for expensive solenoid-actuated clutches in the home appliance industry and would represent a substantial improvement over noisy conventional centrifugal clutches.

In accordance with the present invention, a centrifugal clutch includes a pair of clutch shoes, a rotor, and means for holding the clutch shoes and the rotor in engaged relation so that rotation of the rotor at a speed in excess of a minimum speed imparts enough centrifugal force to the clutch shoes to move the clutch shoes to grip and rotate the holding means, thereby producing torque transmission.

Each clutch shoe is formed to include at least one clutch shoe pocket. A resilient buffer member is mounted in each clutch shoe pocket. The rotor includes at least one rotor arm extending into one of the clutch shoe pockets to impart centrifugal force to the clutch shoe during rotation of the rotor. Each rotor arm is arranged so that it always engages its companion resilient buffer member during rotation of the rotor to deaden sound produced by movement of the rotor arm in its clutch shoe pocket.

In preferred embodiments, the holding means is a clutch drum and each clutch shoe includes three pockets arranged in the clutch drum to position the three clutch shoe pockets adjacent to the rotor. Illustratively, the rotor includes a rotor hub and six rotor arms projecting outwardly from rotor hubs like spokes on a wheel. Three of the rotor arms extend into the three pockets formed in one of the clutch shoes and the other three rotor arms extend into the three pockets formed in the other clutch shoe. It will be understood the number of rotor arms and clutch shoe pockets may vary from one application to another.

Illustratively, a motor-driven power input shaft is attached to the rotor and a power output shaft is attached to the clutch drum. In operation, the motor-driven power input shaft rotates the rotor causing the rotor arms to rotate the clutch shoes. Once the rotor is turning at a fast enough speed, the rotor arms impart enough centrifugal force to the clutch shoes to move the shoes outwardly to grip the clutch drum. This gripping action causes the drum to rotate with the rotor, thereby causing the power output shaft to rotate with the power input shaft and produce torque transmission.

Illustratively, each resilient buffer member is a thin-walled liner made of plastics molding material. Each resilient buffer member functions to cushion the impact between the clutch shoe and one of the rotor arms to produce a quiet-running centrifugal clutch. Preferably, each resilient buffer member is a "snap-in liner" that is retained in its clutch shoe pocket under a compression load by tight-fitting engagement with the clutch shoe. Alternatively, one or more of the resilient buffer members could be a "snap-on liner" or a "slide-on liner" of the rotor arms.

Resilient buffer members in accordance with the present invention function to attenuate noise caused by operation of the centrifugal clutch at low cost. Advantageously, a low-cost centrifugal clutch outfitted with resilient buffer pads can be used in lieu of a more complex and expensive electric solenoid-actuated clutch of the type commonly used in the home appliance industry.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is a sectional view of the assembled centrifugal clutch of FIG. 1 taken along line 2—2 of FIG. 3 showing positioning of several resilient buffer members between the rotor arms and the clutch shoes;

FIG. 3 is a transverse sectional view taken along line 3—3 of FIG. 2 showing the top four rotor arms lying in their companion clutch shoe pockets and four thin-walled "snap-in" resilient buffer members mounted in those pockets to lie between the rotor arms and the clutch shoes;

FIG. 3a is a perspective assembly view of an alternative snap-on resilient buffer member;

FIG. 3b is a view of a snap-on resilient buffer member lying in a clutch shoes pocket;

FIG. 3c is a perspective assembly view of an alternative slide-on resilient buffer member;

FIG. 4 is a transverse sectional view taken along line 4—4 of FIG. 2 showing the bottom two rotor arms lying in their companion clutch shoe pockets and two thin-walled "snap-in" resilient buffer members mounted in those pockets to lie between the rotor arms and the clutch shoes;

DETAILED DESCRIPTION OF THE DRAWINGS

Figure 1:
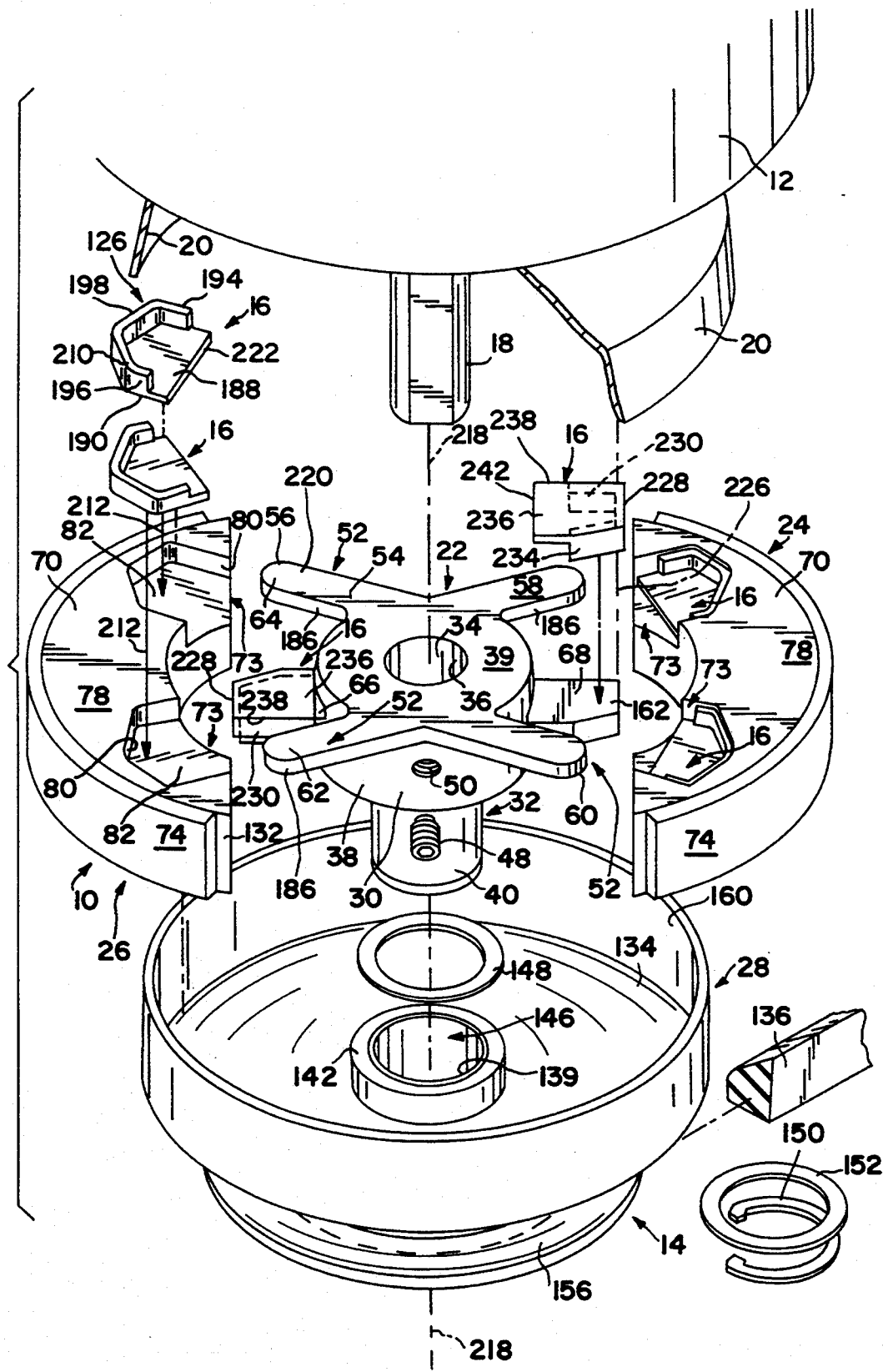
FIG. 1 is a perspective exploded assembly view of a centrifugal clutch in accordance with the present invention showing a rotor with six rotor arms, a pair of lined clutch shoes, several resilient buffer members sized to fit in pockets formed in the clutch shoes, and a clutch drum for holding the rotor and clutch shoes together and the location of the centrifugal clutch to enable it to connect and disconnect a rotatable motor drive shaft to a rotatable sheave engaging a drive belt.

The components of a centrifugal clutch assembly 10 are illustrated in FIG. 1. Clutch 10 is used to control the transmission of torque from a motor 12 to a drive belt sheave 14. One advantage of the assembly 10 is that resilient buffer members 16 are mounted in the clutch 10 to permit the clutch 10 to operate quietly.

The motor 12 contains a motor drive shaft 18 which provides the input power to the clutch 10. The motor drive shaft 18 has an axis of rotation 218. The motor 12 also includes a clutch cover 20 which overlaps the perimeter of clutch 10 as shown in FIG. 2.

Figure 5:
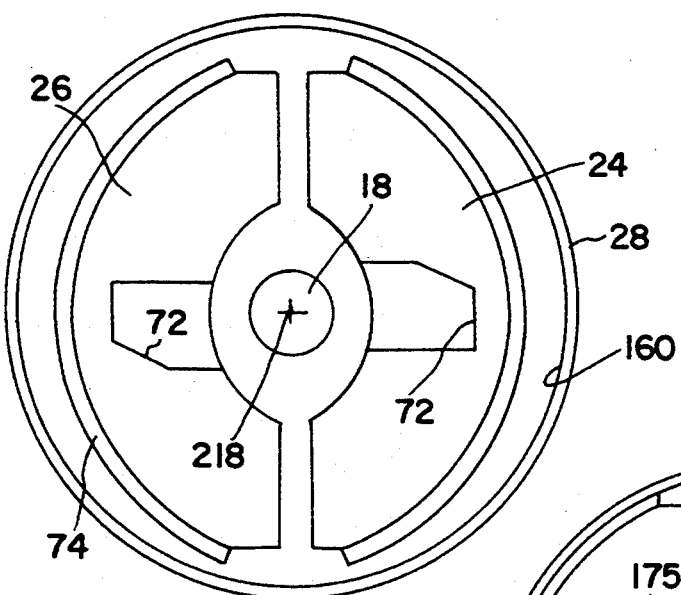
FIG. 5 is a diagrammatic view of a centrifugal clutch in a disengaged position.
Figure 6:
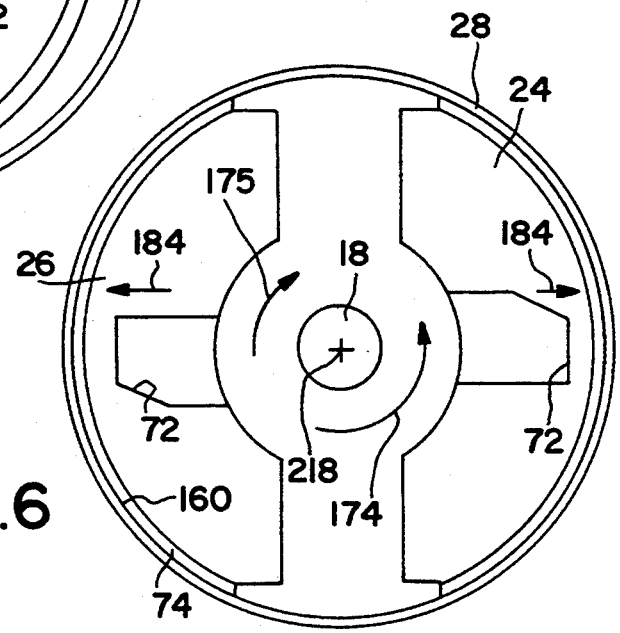
FIG. 6 is a diagrammatic view of the centrifugal clutch of FIG. 5 in an engaged "torque-transmitting" position.

The clutch 10 includes a rotor 22, clutch shoes 24, 26, and a clutch drum 28. The rotor 22 is rotated by the motor drive shaft 18 during operation of the motor 12. The rotor 22 engages and rotates the clutch shoes 24, 26. The clutch shoes 24, 26 engage the clutch drum 28 when the motor drive shaft 18 rotates at a speed greater than the minimum required to impart enough centrifugal force to the clutch shoes 24, 26 such that the clutch shoes 24, 26 move from a disengaged position (shown diagrammatically in FIG. 5) in a radially outward direction 184 from the axis of rotation 218 as shown in FIG. 6 to come into contact with an inner side wall 160 of the clutch drum 28. When the clutch shoes 24, 26 engage the clutch drum 28, the clutch 10 operates to transmit torque from the motor 12 to the drive belt sheave 14 to turn drive belt 136 riding on drive belt sheave 14.

The rotor 22 has an axis of rotation 218, a relatively thick portion, rotor hub 30, and a thinner portion, rotor axle 32, with a cylindrical bore 34 running through both portions 30, 32. The rotor hub 30 has an inner cylindrical surface 36, an outer cylindrical surface 38, and a flat surface 39 which faces toward the motor 12. The rotor axle 32 has an outer cylindrical surface 40 and a flat surface 44 facing away from the motor. A radially outwardly extending annular side wall 46 connects the outer cylindrical surface 38 of the rotor hub 30 to the outer cylindrical surface 40 of the rotor axle 32. The rotor 22 is connected to the motor drive shaft 18 by sliding the motor drive shaft 18 into the cylindrical bore 34 of the rotor hub 30 and rotor axle 32 and tightening a drive shaft set screw 48 through an aperture 50 formed in the rotor hub 30. This connection allows the motor drive shaft 18 to transmit torque to the rotor 22.

The outer cylindrical surface 38 of the rotor hub 30 has a plurality of rotor arms 52 appended to it which rotate about the axis of rotation 218 during operation of motor 12. Each rotor arm 52 includes a proximal end 54 appended to the rotor hub 30 and a distal end 56 to extend into and engage with one of the clutch shoes 24, 26. In the illustrated embodiment, the rotor arms 52 include a first set of retainer arms 58, 60, 62, 64 and a second set of drive arms 66, 68.

Each of clutch shoes 24, 26 includes a shoe body 70, and friction material lining 74. The shoe body 70 includes a lower wall 76 facing toward the clutch drum 28 and an upper wall 78 facing toward the clutch cover 20. The shoe body 70 contains pockets which are defined in the shoe body 70 by an interior side wall 80 and an interior bottom wall 82 arranged in paired adjacent relation as shown best in FIG. 1. Each shoe body 70 may have a plurality of pockets. In the preferred embodiment, shown best in FIG. 3 and FIG. 4, the lower wall 76 of each clutch shoe 24, 26 has one centrally located drive arm-receiving pocket 72 and the upper wall 78 has two laterally spaced retainer arm-receiving pockets 73 arranged to lie on opposite sides of the centrally located pocket.

The retainer arms 58, 60, 62, 64 extend into and engage the retainer arm-receiving pockets 73, as shown in FIG. 3. The drive arms 66, 68 extend into and engage the drive arm-receiving pockets 72, as shown in FIG. 4. By engaging in pockets 72, 73, the rotor arms 52 transmit the torque produced by the motor 12 to the clutch shoes 24, 26. The drive arms 66, 68 are intended to transmit torque while the retainer arms 58, 60, 62, 64 are intended to maintain engagement of the drive arms 66, 68 to the clutch shoes 24, 26.

Due to their different function, the drive arms 66, 68 and retainer arms 58, 60, 62, and 64 are shaped somewhat differently as shown in FIG. 3 and FIG. 4. Each drive arm 66, 68 includes an upper surface 162 facing toward the motor 12, a lower surface 164 facing away from the motor 12, and four upstanding side walls as shown in FIG. 2. These four side walls include end wall 166, long side wall 168, short side wall 170, and angle side wall 172 which connects the short side wall 170 and end wall 166 as shown in FIG. 4. Each drive arm 66, 68 fits into a drive arm-receiving pocket 72, which has four interior side walls. These four interior side walls include end wall 176, long side wall 178, short side wall 180, and angle side wall 182 which connects the short side wall 180 and end wall 176. When the rotor is rotating in direction 174, the angle side walls 172 and short side walls 170 of the drive arms 66, 68 come into contact with the angle side walls 182 and short side walls 180 of drive arm-receiving pockets 72. In response to the rotation in direction 174, the clutch shoes 24, 26 move radially outward in direction 184 due to centrifugal force and the force created by the angle side walls 172 of the drive arms 66, 68 on the angle side walls 182 of the drive arm-receiving pockets 72.

The clutch 10 may also rotate in direction 175 which is opposite of direction 174 as shown in FIG. 4. This allows the drive belt sheave 14 to rotate in either a forward or reverse direction. The clutch 10 changes direction of rotation 174, 175 by controlling the motor 12 so that the motor drive shaft 18 changes direction of rotation 174, 175. The motor drive shaft 18 transfers the change in direction of rotation 174, 175 to the rotor 22 which in turn changes the direction of rotation 174, 175 of the clutch shoes 24, 26. When the clutch shoes 24, 26 engage with the inner side wall 160 of the clutch drum 28 the change in direction of rotation 174, 175 is transferred to the drive belt sheave 14.

The clutch shoes 24, 26 engage with the inner side wall 160 of the clutch drum 28 at a lower rate of rotation when rotating in direction 174 than direction 175. When the clutch shoes 24, 26 are rotating in direction 174 they move radially outward in direction 184 due to a combination of centrifugal force and the force created by the angle side walls 172 of the drive arms 66, 68 acting on the angle side walls 182 of the drive-arm receiving pockets 72. When the clutch shoes 24, 26 are rotating in direction 175 they move radially outward 184 due to centrifugal force alone. Therefore, the clutch 10 is more "aggressive" when rotating in direction 174 than when rotating in direction 175 because the clutch 10 will engage the inner wall 160 of the clutch drum 28 at a lower rate of rotation when rotating in direction 174 then in direction 175.

In alternative embodiments, retraction springs (not shown) may be used to select the minimum rotation required by the motor 12 for the clutch shoes 24, 26 to engage with the clutch drum 28. The retraction springs (not shown) are positioned to lie between and interconnect clutch shoe 24 and clutch shoe 26. The spring constant of the retraction springs (not shown) is selected so that when the desired minimum rotation is achieved, the outward radial force acting on the clutch shoes 24, 26 overcomes the force of the springs, thereby causing the clutch shoes 24, 26 to contact the inner side wall of the clutch drum 28.

Each retainer arm 58, 60, 62, 64 includes a rectangle-shaped portion 244, a semicircle-shaped portion 246 at the distal end 56, and a side wall 186, as shown in FIGS. 3a–3c. The side wall 186 of the retainer arms 58, 60, 62, 64 may engage with the interior side walls 80 of the retainer arm-receiving pocket 84, 86, 88, 90, but a significant amount of torque is transferred between the drive arms 66, 68 and drive arm-receiving pockets 72.

The drive arms 66, 68 and retainer arms 58, 60, 62, 64 are located on the rotor hub 30 to maintain stability of the clutch shoes 24, 26. A "three point" design is used in the placement of the rotor arms 52 as this allows the clutch shoes 24, 26 to self-center and maintain stability. The "three point" design is accomplished by engaging one drive arm 66, 68 and two retainer arms 58, 60, 62, 64 per clutch shoe 24, 26. The two drive arms 66, 68 are spaced 180° apart on the rotor hub 30 and extend radially outward from the outer cylindrical surface 38 of rotor hub 30 perpendicular to the axis of rotation 218 of the clutch 10. The four retainer arms 58, 60, 62, 64 extend outward from the outer cylindrical surface 38 of the rotor hub 30 as shown in FIG. 3. The retainer arms 58, 60, 62, 64 have a flat surface 220 which is flush with the flat surface 39 of the rotor hub 30. The placement of the retainer arms 58, 60, 62, 64 is symmetric about axis x—x and axis y—y as shown in FIG. 3. The location of the drive arms 66, 68 and retainer arms 58, 60, 62, 64 are fixed relative to each other with drive arm 66 extending between retainer arms 62 and 64 and drive arm 68 extending between rotor arms 58 and 60. The location of the drive arms 66, 68 and retainer arms 58, 60, 62, 64 allows the clutch shoe 24, 26 to self-center and maintain stability. In alternative embodiments, any suitable number and shape of drive arms 66, 68 and retainer arms 58, 60, 62, 64 may be used.

The resilient buffer members 16 are placed between the rotor arms 52 and pockets 72, 73, as shown in FIGS. 1–4. The resilient buffer members 16 provide a cushion to deaden the noise and block any metal-on-metal contact that might otherwise be produced by the engagement of the rotor arms 52 and pockets 72, 73 when they are in rotation.

The resilient buffer members 16 may be of any shape as long as they perform their function by remaining between the rotor arms 52 and pockets 72, 73 during rotation of the clutch 10 by motor 12. The shape of the resilient buffer members 16 in the illustrated embodiments differ for retainer arms 58, 60, 62, 64 and drive arms 66, 68 due to their different functions. Two embodiments of resilient buffer member 16 shapes that may be used between retainer arms 58, 60, 62, 64 and retainer arm-receiving pockets 73 are shown in FIG. 1 and FIGS. 3a–3c.

The resilient buffer members 16 assembled in the retainer arm-receiving pockets 73 in FIG. 1 include a flat bottom wall 188 with a perimeter edge 190, multi-segmented upstanding side walls appended to the perimeter edge 190, and an open end 222. The multi-segmented side walls include upstanding short side walls 194, 196 and upstanding angle side walls 198, 210. Upstanding short side walls 194, 196 are parallel to each other and are in series with upstanding side walls 198, 210. The perimeter of this resilient buffer member 16 is in a pentagonal shape 126. The retainer arm-receiving pocket 73 has an interior bottom wall 82 and multi-segmented pocket border walls such as interior side walls 80. The multi-segmented upstanding side walls 194, 196, 198, 210 of the resilient buffer members 16 abut the multi-segmented pocket border walls 80 of the retainer arm-receiving pocket 73 and the flat bottom wall 188 of the resilient buffer member 16 abuts the interior bottom wall 82 of the retainer arm-receiving pocket 73. Resilient buffer member 16 with multi-segmented upstanding side walls 194, 196, 198, 210 is slightly larger than space provided by the retainer arm-receiving pocket 73 such that the resilient buffer member 16 is assembled 212 in a snap-fit (compression) relationship with the retainer arm-receiving pocket 73.

The resilient buffer members 16 assembled in the retainer arm-receiving pockets 73 in FIGS. 3a–3c have a rectangle-shaped portion 128 at one end and a semicircle-shaped portion 130 at the other end. These resilient buffer members 16 are mounted to engage the semicircle-shaped portion 130 to the semicircle-shaped portion 246 of the retainer arm 58, 60, 62, 64 and position the rectangle-shaped portion 128 on the rectangle-shaped portion 244 of the retainer arm 58, 60, 62, 64.

The resilient buffer members 16 displayed in FIG. 3a and FIG. 3b include a flat bottom wall 96 having a perimeter edge 98 with upstanding side walls 110 appended to the flat bottom wall 96 along the perimeter edge 98 except for a boundary edge 112. The upstanding side walls 110 form a U-shaped chamber for receiving a retainer arm 58, 60, 62, 64. The resilient buffer members 16 are snapped 224 onto the retainer arms 58, 60, 62, 64 during assembly as displayed in FIG. 3a. FIG. 3b illustrates a retainer arm 58, 60, 62, 64 and snap-on resilient buffer member 16 lying in a retainer arm-receiving pocket 73. The resilient buffer member 16 in FIG. 3c includes a flat bottom wall 114 with a perimeter edge 116 and a flat upper wall 118 with a perimeter edge 120 and an upstanding side wall 122 which connects the flat bottom wall 114 and flat upper wall 118 at their perimeter edge 116, 120 to form an aperture 124. FIG. 3c illustrates an embodiment in which the resilient buffer member 16 is slid 216 onto the retainer arm 58, 60, 62, 64 during assembly.

The resilient buffer members 16 assembled on the drive arms 66, 68 in FIG. 1 include a flat bottom wall 236 having a perimeter edge 238 with upstanding side walls appended to the perimeter edge 238 except for an open end 242. The upstanding side walls include an upstanding end wall 228, an upstanding long side wall 230, and an upstanding angle wall 234. This resilient buffer member 16 is designed to assemble in a snap-fit (compression) 226 relation onto the drive arms 66, 68. In its assembled position, the upstanding side walls 228, 230, 234 of the resilient buffer member 16 will be pressed between the interior side walls 176, 178, 180, 182 of the drive arm-receiving pocket 72, and the upstanding side walls 166, 168, 170, 172 of the drive arm 66, 68 as shown in FIG. 4. The flat bottom wall 236 of the resilient buffer member 16 will be pressed between the interior bottom wall 82 of the drive arm-receiving pocket 72 and the upper surface 162 of the drive arm 66, 68 as shown in FIG. 2. This assembly prevents metal on metal contact when the drive arms 66, 68 are transmitting torque to the clutch shoes 24, 26.

In alternative embodiments, the resilient buffer members 16 may be assembled onto a rotor arm 52 or in a pocket 72, 73 using any one of a snap fit, close or loose fitting, or a sliding fit engagement. The resilient buffer members 16 are preferably thin-walled and made of plastics molding material such as polyurethane. However, any elastic type material or thickness of walls would be acceptable.

Figure 7:
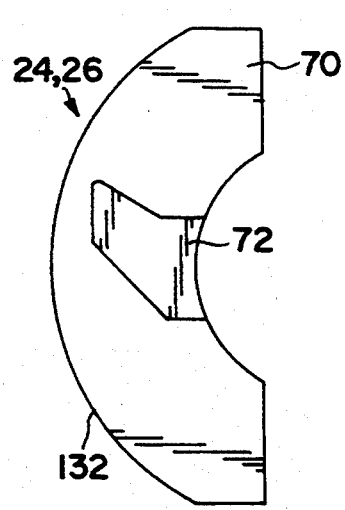
FIG. 7 is a view of one alternative clutch shoe (without a lining)
Figure 8:
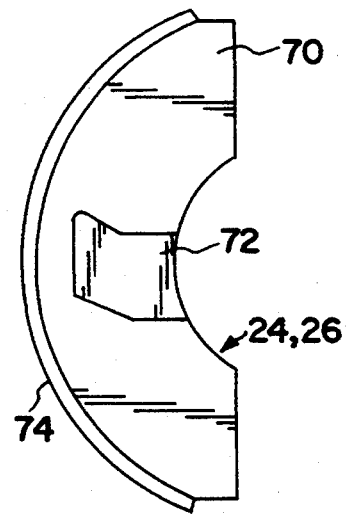
FIG. 8 is a view of another alternative clutch shoe (with a lining).

The clutch shoe 24, 26 includes friction material lining 74 which is placed on the perimeter 132 of the clutch shoes 24, 26. FIG. 7 and FIG. 8 present different embodiments showing that the use of friction lining material 74 is optional. A clutch shoe 24, 26 without any additional friction material lining is shown in FIG. 7 and a clutch shoe 24, 26 with a friction material lining 74 is shown in FIG. 8.

The clutch drum 28 includes a round chamber 134 for containing the clutch shoes 24, 26, a drive belt sheave 14 for supporting and rotating a drive belt 136, and inner side wall 160. The drive belt 136 transmits the torque produced by the motor 12 and passed through clutch 10 to another mechanism (not shown). The clutch drum 28 includes a drum hub 138 which has an inner cylindrical surface 140 created by a cylindrical bore 146, an upper flat surface 142 which faces toward the clutch 10, and a lower flat surface 144 which faces away from the clutch 10.

The rotor 22 attaches to the clutch drum 28 by sliding the outer cylindrical surface 40 of the rotor axle 32 into the cylindrical bore 146 of the drum hub 138. An annular bronze bushing 139 is assembled between the outer cylindrical surface 40 of the rotor axle 32 and the inner cylindrical surface 140 of the drum hub 138 as shown in FIG. 2. The bronze bushing 139 does not transfer torque from the rotor axle 32 to the drum hub 138 but merely prevents the outer cylindrical surface 40 of the rotor axle 32 and the inner cylindrical surface 140 of the drum hub 138 from wearing. An upper washer 148 is assembled between the radially outwardly extending annular side wall 46 of the rotor 22 and the upper flat surface 142 of the drum hub 138 to prevent the surfaces from wearing.

In its assembled position, shown in FIG. 2, the rotor axle 32 extends through the cylindrical bore 146 of the drum hub 138 and past the lower flat surface 144 of the drum hub 138. The outer cylindrical surface 40 of the rotor axle 32 includes a groove 153 which in the assembled position is located between the lower flat surface 144 of the drum hub 138 and flat surface 44 of the rotor axle 32, as shown in FIG. 2. A C-shaped snap ring 150 is assembled in the groove 153 to hold the rotor 22 and clutch drum 28 together. A lower washer 152 is assembled between the C-shaped snap ring 150 and lower flat surface 144 of the drum hub 138 to prevent the surfaces from wearing.

The drive belt sheave 14 holds the drive belt 136 on a flat surface 154 between a lower sheave wall 156 and an upper sheave wall 158. In the illustrated embodiment, the drive belt sheave 14 is part of the clutch drum 28. However, in alternative embodiments, the drive belt sheave 14 may be a separate part coupled to the clutch drum 28. In the illustrated embodiment, the clutch 10 operates to transmit torque from the motor 12 to a drive belt sheave 14. However, the clutch 10 could transmit torque from a motor 12 to any power transmission device (not shown).

The motor drive shaft 18 rotates the rotor 22 which in turn rotates the rotor arms 52. The drive arms 66, 68 engage and rotate the clutch shoes 24, 26. The clutch shoes 24, 26 engage the clutch drum 28 when the motor drive shaft 18 rotates in direction 174 or direction 175 at a speed greater than the minimum required to impart enough centrifugal force on the clutch shoes 24, 26 such that the clutch shoes 24, 26 move radially outward in direction 184 from the axis of rotation 218 to come into contact with the inner surface 160 of the clutch drum 28. This is illustrated diagrammatically in FIGS. 5 and 6. In FIG. 5, the motor drive shaft 18 is stopped or rotating at a speed less than the minimum required and the clutch shoes 24, 26 are not engaged with the inner surface 160 of the clutch drum 28. As shown diagrammatically in FIG. 6, the motor drive shaft 18 is rotating at a speed greater than the minimum and the clutch shoes 24, 26 are engaged with the clutch drum 28. When the clutch 10 is in the non-engaged position, shown diagrammatically in FIG. 5, the clutch drum 28 and drive belt sheave 14 are not rotating and thus no torque is being transmitted by the drive belt 136. When the clutch 10 is in the engaged position, shown in FIG. 6, the clutch drum 28 and drive belt sheave 14 rotate and thus torque is being transmitted by the drive belt 136. The resilient buffer members 16 perform their function of deadening noise in the clutch 10 when the clutch 10 is rotating regardless of whether the clutch shoes 24, 26 are engaging the clutch drum 28.

Although this invention has been described in detail with reference to certain embodiments, variations and modifications exist within the scope and spirit of the invention as described and as defined in the following claims.

I claim:

1. A centrifugal clutch comprising
a pair of clutch shoes, each clutch shoe formed to include at least one clutch shoe pocket, each clutch shoe including an interior side wall and an interior bottom wall arranged in paired adjacent relation to define each clutch shoe pocket,
a rotor including a rotor arm extending into one of the clutch shoe pockets and lying adjacent to the interior bottom wall situated in said one of the clutch shoe pockets,
a resilient buffer member positioned in each clutch shoe pocket to lie between the interior bottom wall and the rotor arm in each clutch shoe pocket to block direct contact between said rotor arm and interior bottom wall, and means for holding the clutch shoes and the rotor in engaged relation so that the rotor arm always engages the resilient buffer member during rotation of the rotor to impart centrifugal force to the clutch shoes to deaden sound produced by movement of the rotor arm in said one of the clutch shoe pockets.

2. The centrifugal clutch of claim 1, wherein each resilient buffer member is a thin-walled liner made of plastics molding material and retained in its clutch shoe pocket under a compression load established by tight-fitting engagement with the clutch shoe.

3. The centrifugal clutch of claim 1, wherein each resilient buffer member is made of polyurethane and shaped to fit in one of the clutch shoe pockets in close-fitting relation.

4. The clutch of claim 1, wherein the resilient buffer member includes a flat bottom wall having a perimeter edge and an upstanding side wall appended to the flat bottom wall at the perimeter edge.

5. The clutch of claim 4, wherein the upstanding side wall is formed to include a U-shaped chamber receiving the rotor arm therein.

6. The clutch of claim 4, wherein each clutch shoe includes a plurality of pocket floors and multi-segmented pocket border walls, one of the pocket floors cooperates with one of the multi-segmented pocket border walls to define the boundary of one of the clutch shoe pockets, the bottom wall of the resilient buffer member abuts the pocket floor of said one of the clutch shoe pockets, and the upstanding side wall abuts the multi-segmented pocket border wall of said one of the clutch shoe pockets.

7. The clutch of claim 6, wherein the multi-segmented pocket border wall includes four wall segments and the upstanding side wall includes four wall portions arranged so that each wall portion engages one of the four wall segments.

8. The centrifugal clutch of claim 1, wherein at least one of the resilient buffer members is mounted on the rotor arm to move therewith.

9. The centrifugal clutch of claim 8, wherein said at least one of the resilient buffer members is formed to include a rotor arm-receiving aperture receiving said rotor arm.

10. The centrifugal clutch of claim 9, wherein said at least one of the resilient buffer members includes a bottom wall having a perimeter edge, an upper wall having a perimeter edge, and a U-shaped upstanding side wall interconnecting the bottom wall and the top wall at said perimeter edges to form the rotor arm-receiving aperture and position the rotor arm received in the rotor arm-receiving aperture between the top and bottom walls.

11. The centrifugal clutch of claim 8, wherein said at least one of the resilient buffer members is formed to include a shallow open-topped rotor arm-receiving chamber receiving said rotor arm.

12. The centrifugal clutch of claim 11, wherein said at least one of the resilient buffer members includes a bottom wall having a perimeter edge and a U-shaped upstanding side wall appended to the bottom wall along the perimeter edge and formed to include a rotor arm-receiving opening.

13. The centrifugal clutch of claim 1, wherein each clutch shoe is formed to include three clutch shoe pockets and a resilient buffer member is mounted on the rotor arm lying in each clutch shoe pocket.

14. The centrifugal clutch of claim 13, wherein the holding means includes a drum containing the clutch shoes, each clutch shoe includes a lower wall facing toward the drum and an upper wall facing away from the drum, the lower wall is formed to include one of the three clutch shoe pockets, and the upper wall is formed to include the others of the three clutch shoe pockets.

15. The centrifugal clutch of claim 13, wherein the rotor includes a hub having an axis of rotation, a first set of four rotor arms appended to the hub and a second set of two rotor arms appended to the hub, the first and second sets being arranged to lie in spaced-apart relation along the axis of rotation of the hub, two of the rotor arms in the first set carrying resilient buffer members in clutch shoe pockets formed in a first of the clutch shoes and the other two of the rotor arms in the first set carry resilient buffer members in clutch shoe pockets formed in a second of the clutch shoes, and one of the rotor arms in the second set carries a resilient buffer member in one of the clutch shoe pockets formed in the first of the clutch shoes and another of the rotor arms in the second set carries a resilient buffer member in one of the clutch shoe pockets formed in the second of the clutch shoes.

16. The centrifugal clutch of claim 1, wherein one of the clutch shoes includes an upper wall formed to include two spaced-apart top-opening clutch shoe pockets and a lower wall formed to include one bottom-opening clutch shoe pocket, the bottom-opening clutch shoe pocket is positioned to lie between the two spaced-apart top-opening clutch shoe pockets, the rotor includes a rotor hub having an upper end and a lower end, a first rotor arm appended to the lower end and configured to fit into the bottom-opening clutch shoe pocket to define drive means for transmitting torque from the rotor to said one of the clutch shoes, and second and third rotor arms are appended to the upper end and arranged to lie in spaced-apart relation, and each of the second and third rotor arms extend into one of the top-opening clutch shoe pockets to define retainer means for maintaining engagement of the first rotor arm in the bottom-opening clutch shoe pocket during rotation of the rotor.

17. The centrifugal clutch of claim 16, wherein one of the resilient buffer members is mounted on the first rotor arm to move therewith.

18. The centrifugal clutch of claim 17, wherein one of the resilient buffer members is mounted on each of the second and third rotor arms to move therewith.

19. The centrifugal clutch of claim 16, wherein another of the clutch shoes includes an upper wall formed to include two spaced-apart top-opening clutch shoe pockets and a lower wall formed to include one bottom-opening clutch shoe pocket, the bottom-opening clutch shoe pocket in said another of the clutch shoes is positioned to lie between the two spaced-apart top-opening clutch shoe pockets in said another of the clutch shoes, a fourth rotor arm is appended to the lower end of the rotor and configured to fit into the bottom-opening clutch shoe pocket in said another of the clutch shoes to define drive means for transmitting torque from the rotor to said another of the clutch shoes, fifth and sixth rotor arms are appended to the upper end of the rotor and arranged to lie in spaced-apart relation to one another, and each of the fifth and sixth rotor arms extend into one of the top-opening clutch shoe pockets in said another of the clutch shoes to define retainer means for maintaining engagement of the fourth rotor arm in the bottom-opening clutch shoe pocket in said another of the clutch shoes during rotation of the rotor.

20. The centrifugal clutch of claim 19, wherein one of the resilient buffer members is mounted on each of the first and fourth rotor arms to move therewith.

21. The centrifugal clutch of claim 20, wherein one of the resilient buffer members is mounted on each of the second, third, fifth, and sixth rotor arms to move therewith.

22. A centrifugal clutch comprising
    a pair of clutch shoes, each clutch shoe formed to include at least one clutch shoe pocket,
    a resilient buffer member mounted in each clutch shoe pocket,
    a rotor including a rotor arm extending into one of the clutch shoe pockets, and
    means for holding the clutch shoes and the rotor in engaged relation so that the rotor arm always engages the resilient buffer member during rotation of the rotor to impart centrifugal force to the clutch shoes to deaden sound produced by movement of the rotor arm in said one of the clutch shoe pockets, each resilient buffer member being a thin-walled liner made of plastics molding material and retained in its clutch shoe pocket under a compression load established by tight-fitting engagement with the clutch shoe, and each resilient buffer member including a flat bottom wall having a perimeter edge and an upstanding side wall appended to the flat bottom wall at the perimeter edge.

23. The centrifugal clutch of claim 22, wherein each clutch shoe includes an interior side wall and an interior bottom wall arranged in paired adjacent relation to define each clutch shoe pocket and each resilient buffer member is arranged in one of the clutch shoe pockets to engage the flat bottom wall against the interior bottom wall and the upstanding side wall against the interior side wall.

24. A centrifugal clutch comprising
    a pair of clutch shoes, each clutch shoe formed to include at least one clutch shoe pocket,
    a resilient buffer member mounted in each clutch shoe pocket,
    a rotor including a rotor arm extending into one of the clutch shoe pockets, and
    means for holding the clutch shoes and the rotor in engaged relation so that the rotor arm always engages the resilient buffer member during rotation of the rotor to impart centrifugal force to the clutch shoes to deaden sound produced by movement of the rotor arm in said one of the clutch shoe pockets, each clutch shoe being formed to include three clutch shoe pockets and a resilient buffer member being mounted in each clutch shoe pocket.

25. The centrifugal clutch of claim 24, wherein the holding means includes a drum containing the clutch shoes, each clutch shoe includes a lower wall facing toward the drum and an upper wall facing away from the drum, the lower wall is formed to include one of the three clutch shoe pockets, and the upper wall is formed to include the others of the three clutch shoe pockets.

26. The centrifugal clutch of claim 24, wherein the rotor includes a hub having an axis of rotation, a first set of four rotor arms appended to the hub and a second set of two rotor arms appended to the hub, the first and second sets being arranged to lie in spaced-apart relation along the axis of rotation of the hub, two of the rotor arms in the first set engage resilient buffer members mounted in clutch shoe pockets formed in a first of the clutch shoes and the other two of the rotor arms in the first set engage resilient buffer members mounted in clutch shoe pockets formed in a second of the clutch shoes, and one of the rotor arms in the second set engages a resilient buffer member mounted in one of the clutch shoe pockets formed in the first of the clutch shoes and another of the rotor arms in the second set engages a resilient buffer member mounted in one of the clutch shoe pockets formed in the second of the clutch shoes.

27. A centrifugal clutch for connecting and disconnecting a rotating input shaft and a rotatable output shaft, the clutch comprising
    a pair of clutch shoes, each clutch shoe being formed to include at least one rotor arm-receiving pocket,
    a rotor including a hub having an axis of rotation and arm means appended to the hub for engaging each clutch shoe in one of the rotor arm-receiving pockets and input means for coupling the hub to the rotating input shaft so that the arm means rotates about the axis of rotation of the hub in response to rotation of the rotating input shaft,
    a drum including a shoe-engaging wall and means for holding the clutch shoes adjacent to the shoe-engaging wall and the rotor between the clutch shoes so that the arm means of the rotor extends into the rotor arm-receiving pockets of the clutch shoes and imparts centrifugal force to the clutch shoes to move the clutch shoes outward from the axis of rotation of the hub to engage and rotate the shoe-engaging wall during rotation of the rotor and the arm means at a speed in excess of a minimum speed,
    output means for rotating the rotatable output shaft in response to rotation of the shoe-engaging wall of the drum, the output means being coupled to the drum, and
    a molded resilient buffer member made of plastics molding material lying in each rotor arm-receiving pocket between the arm means and the clutch shoe, the arm means including a plurality of rotor arms, each rotor arm including a proximal end appended to the hub and a distal end lying in one of the rotor arm-receiving pockets, and at least one of the resilient buffer members being mounted in snap-on relation on the distal end of one of the rotor arms to move with the rotor.

28. The clutch of claim 27, wherein the at least one of the resilient buffer members has a rectangle-shaped portion at one end and a semicircle-shaped portion at another end and is mounted to engage the semicircle-shaped portion to said distal end of one of the rotor arms and position the rectangle-shaped portion on said one of the rotor arms between said distal and proximal ends.

29. A centrifugal clutch for connecting and disconnecting a rotating input shaft and a rotatable output shaft, the clutch comprising
    a pair of clutch shoes, each clutch shoe being formed to include at least one rotor arm-receiving pocket, each clutch shoe including an interior side wall and an interior bottom wall arranged in paired adjacent relation to define each rotor arm-receiving pocket, a rotor including a hub having an axis of rotation and arm means appended to the hub for engaging each clutch shoe in one of the rotor arm-receiving pockets and input means for coupling the hub to the rotating input shaft so that the arm means rotates about the axis of rotation of the hub in response to rotation of the rotating input shaft, a drum including a shoe-engaging wall and means for holding the clutch shoes adjacent to the shoe-engaging wall and the rotor between the clutch shoes so that the arm means of the rotor extends into the rotor arm-receiving pockets of the clutch shoes and imparts centrifugal force to the clutch shoes to move the clutch shoes outward from the axis of rotation of the hub to engage and rotate the shoe-engaging wall during rotation of the rotor and the arm means at a speed in excess of a minimum speed, output means for rotating the rotatable output shaft in response to rotation of the shoe-engaging wall of the drum, the output means being coupled to the drum, and a resilient buffer member mounted in each rotor arm-receiving pocket in snap-fit relation to the clutch shoe to lie between the arm means and the interior bottom wall in each clutch shoe and deaden sound produced by movement of the arm means in the rotor arm-receiving pockets during rotation of the rotor about the axis of rotation of the hub.

30. A centrifugal clutch for connecting and disconnecting a rotating input shaft and a rotatable output shaft, the clutch comprising a pair of clutch shoes, each clutch shoe being formed to include at least one rotor arm-receiving pocket, each clutch shoe including an interior side wall and an interior bottom wall arranged in paired adjacent relation to define each rotor arm-receiving pocket,.

a rotor including a hub having an axis of rotation and arm means appended to the hub for engaging each clutch shoe in one of the rotor arm-receiving pockets and input means for coupling the hub to the rotating input shaft so that the arm means rotates about the axis of rotation of the hub in response to rotation of the rotating input shaft, a drum including a shoe-engaging wall and means for holding the clutch shoes adjacent to the shoe-engaging wall and the rotor between the clutch shoes so that the arm means of the rotor extends into the rotor arm-receiving pockets of the clutch shoes and imparts centrifugal force to the clutch shoes to move the clutch shoes outward from the axis of rotation of the hub to engage and rotate the shoe-engaging wall during rotation of the rotor and the arm means at a speed in excess of a minimum speed, output means for rotating the rotatable output shaft in response to rotation of the shoe-engaging wall of the drum, the output means being coupled to the drum, and a resilient buffer member mounted in snap-on relation on the arm means to move with the rotor and lie in each rotor arm-receiving pocket between the arm means and the interior bottom wall in each clutch shoe and deaden sound produced by movement of the arm means in the rotor arm-receiving pockets during rotation of the rotor about the axis of rotation of the hub.

31. A centrifugal clutch for connecting and disconnecting a rotating input shaft and a rotatable output shaft, the clutch comprising a pair of clutch shoes, each clutch shoe being formed to include at least one rotor arm-receiving pocket, each clutch shoe including an interior side wall and an interior bottom wall arranged in paired adjacent relation to define each rotor arm-receiving pocket, a rotor including a hub having an axis of rotation and arm means appended to the hub for engaging each clutch shoe in one of the rotor arm-receiving pockets and input means for coupling the hub to the rotating input shaft so that the arm means rotates about the axis of rotation of the hub in response to rotation of the rotating input shaft, a drum including a shoe-engaging wall and means for holding the clutch shoes adjacent to the shoe-engaging wall and the rotor between the clutch shoes so that the arm means of the rotor extends into the rotor arm-receiving pockets of the clutch shoes and imparts centrifugal force to the clutch shoes to move the clutch shoes outward from the axis of rotation of the hub to engage and rotate the shoe-engaging wall during rotation of the rotor and the arm means at a speed in excess of a minimum speed, output means for rotating the rotatable output shaft in response to rotation of the shoe-engaging wall of the drum, the output means being coupled the drum, and a resilient buffer member lying in each rotor arm-receiving pocket between the arm means and the interior bottom wall in each clutch shoe, the resilient buffer member being mounted on the arm means to move therewith and formed to include aperture means for slidably receiving the arm means therein and wall means around the aperture means for cushioning engagement between the arm means and the clutch shoe to deaden sound produced by movement of the arm means in the rotor arm-receiving pockets during rotation of the rotor about the axis of rotation of the hub.

32. A shoe assembly for use in a centrifugal clutch, the assembly comprising a clutch shoe formed to include pocket means for receiving a rotor arm therein, and a resilient buffer member fixed in the pocket means and configured to provide cushion means for cushioning impact between a rotor arm moving in the pocket means to impart centrifugal force to the clutch shoe, each resilient buffer member being a thin-walled liner made of plastics molding material and retained in its pocket means under a compression load established by tight-fitting engagement with the clutch shoe and each resilient buffer member including a flat bottom wall having a perimeter edge and an upstanding side wall appended to the flat bottom wall at the perimeter edge.

33. The shoe assembly of claim 32, wherein the upstanding side wall is formed to include a U-shaped chamber receiving the rotor arm therein.

34. The shoe assembly of claim 32, wherein each pocket means includes an interior side wall and an interior bottom wall arranged in paired adjacent relation and each resilient buffer member is arranged in one of the pocket means to engage the flat bottom wall against the interior bottom wall and the upstanding side wall against the interior side wall.

35. The shoe assembly of claim 32, wherein each clutch shoe includes a plurality of pocket floors and multi-segmented pocket border walls, one of the pocket floors cooperates with one of the multi-segmented pocket border walls to define the boundary of one of the pocket means, the bottom wall of the resilient buffer member abuts the pocket floor of said one of the pocket means, and the upstanding side wall abuts the multi-segmented pocket border wall of said one of the pocket means.

36. The shoe assembly of claim 35, wherein the multi-segmented pocket border wall includes four wall segments and the upstanding side wall includes four wall portions arranged so that each wall portion engages one of the four wall segments.

37. A shoe assembly for use in a centrifugal clutch, the assembly comprising
a clutch shoe formed to include pocket means for receiving a rotor arm therein, and
a resilient buffer member fixed in the pocket means and configured to provide cushion means for cushioning impact between a rotor arm moving in the pocket means to impart centrifugal force to the clutch shoe, each clutch shoe being formed to include three clutch shoe pockets and a resilient buffer member being mounted in each clutch shoe pocket.

38. The shoe assembly of claim 37, wherein each resilient buffer member is a thin-walled liner made of plastics molding material and retained in its pocket means under a compression load established by tight-fitting engagement with the clutch shoe.

39. A shoe assembly for use in a centrifugal clutch, the assembly comprising
a clutch shoe formed to include pocket means for receiving a rotor arm therein, and
a resilient buffer member fixed in the pocket means and configured to provide cushion means for cushioning impact between a rotor arm moving in the pocket means to impart centrifugal force to the clutch shoe, the at least one of the resilient buffer members having a pentagonal shape and being mounted to fit in the pocket means formed in the clutch shoe to have a matching pentagonal shape.

40. An assembly for use in a centrifugal clutch, the assembly comprising
a clutch shoe formed to include a pocket,
a rotor hub having an axis of rotation,
a plurality of rotor arms, each rotor arm including a proximal end appended to the rotor hub and a distal end extending into the pocket of the clutch shoe,
input means for coupling the rotor hub to a rotating input shaft so that the rotor arm rotates about the axis of rotation of the rotor hub in response to rotation of the rotating input shaft, and
a resilient buffer member including means for mechanically clasping to the distal end of the rotor arm to rotate therewith and move in the pocket of the clutch shoe relative to the clutch shoe so that the resilient buffer member provides cushion means for cushioning impact between a rotor arm and its mating part.

41. The rotor assembly of claim 40, wherein each resilient buffer member is a thin-walled liner made of plastics molding material and mechanically clasped to the rotor arm by a tight-fitting engagement.

42. The rotor assembly of claim 40, wherein each resilient buffer member is made of polyurethane and shaped to fit on one of the rotor arms in close-fitting relation.

43. A rotor assembly for use in a centrifugal clutch, the assembly comprising
a rotor hub having an axis of rotation,
a plurality of rotor arms, each rotor arm including a proximal end appended to the rotor hub and a distal end to engage with a mating part,
input means for coupling the rotor hub to a rotating input shaft so that the rotor arm rotates about the axis of rotation of the rotor hub in response to rotation of the rotating input shaft, and
a resilient buffer member including means for mechanically clasping to the distal end of the rotor arm to rotate therewith so that the resilient buffer member provides cushion means for cushioning impact between a rotor arm and its mating part, each resilient buffer member being a thin-walled liner made of plastics molding material and mechanically clasped to the rotor arm by a tight-fitting engagement, and each resilient buffer member including a flat bottom wall having a perimeter edge and an upstanding side wall being appended to the flat bottom wall at the perimeter edge.

44. The rotor assembly of claim 43, wherein the upstanding side wall is formed to include a U-shaped chamber receiving the rotor arm therein.

45. A rotor assembly for use in a centrifugal clutch, the assembly comprising
a rotor hub having an axis of rotation,
a plurality of rotor arms, each rotor arm including a proximal end appended to the rotor hub and a distal end to engage with a mating part,
input means for coupling the rotor hub to a rotating input shaft so that the rotor arm rotates about the axis of rotation of the rotor hub in response to rotation of the rotating input shaft, and
a resilient buffer member including means for mechanically clasping to the distal end of the rotor arm to rotate therewith so that the resilient buffer member provides cushion means for cushioning impact between a rotor arm and its mating part, the at least one of the resilient buffer members having a rectangle-shaped portion at one end and a semicircle-shaped portion at another end and being mounted to engage the semicircle-shaped portion to said distal end of one of the rotor arms and position the rectangle-shaped portion on said one of the rotor arms between said distal and proximal ends.

46. A rotor assembly for use in a centrifugal clutch, the assembly comprising
a rotor hub having an axis of rotation,
a plurality of rotor arms, each rotor arm including a proximal end appended to the rotor hub and a distal end to engage with a mating part,
input means for coupling the rotor hub to a rotating input shaft so that the rotor arm rotates about the axis of rotation of the rotor hub in response to rotation of the rotating input shaft, and
a resilient buffer member including means for mechanically clasping to the distal end of the rotor arm to rotate therewith so that the resilient buffer member provides cushion means for cushioning impact between a rotor arm and its mating part, the resilient buffer member being formed to include aperture means for slidably receiving the arm means therein and wall means around the aperture means for cushioning engagement between the rotor arm and mating part to deaden sound produced by movement of the rotor arm in the mating part during rotation of the rotor about the axis of rotation of the rotor hub.

47. A centrifugal clutch comprising a rotor having a rotor arm, a clutch shoe formed to include pocket means for receiving the rotor arm therein, and a resilient buffer member fixed on the rotor arm to move therewith relative to the clutch shoe and to extend into the pocket means and configured to provide cushion means for cushioning impact between the rotor arm moving in the pocket means to impart centrifugal force to the clutch shoe, the resilient buffer member being formed to include a rotor arm-receiving aperture receiving the rotor arm.

48. The centrifugal clutch of claim 47, wherein each resilient buffer member is made of plastics material and shaped to fit in one of the pocket means in close-fitting relation.

49. The centrifugal clutch of claim 47, wherein the resilient buffer member includes a bottom wall having a perimeter edge, an upper wall having a perimeter edge, and a U-shaped upstanding side wall interconnecting the bottom wall and the top wall at said perimeter edges to form the rotor arm-receiving aperture and position the rotor arm received in the rotor arm-receiving aperture between the top and bottom walls.

50. A centrifugal clutch comprising a rotor having a rotor arm, a clutch shoe formed to include pocket means for receiving the rotor arm therein, the rotor arm having an axis of rotation, and a resilient buffer member fixed on the rotor arm to move therewith relative to the clutch shoe and to extend into the pocket means and configured to provide cushion means for cushioning impact between the rotor arm moving in the pocket means to impart centrifugal force to the clutch shoe, the resilient buffer member being formed to include a shallow, open-topped rotor arm-receiving chamber having a wall engaging the rotor arm, the wall facing in the direction of the axis of rotation, and the rotor arm-receiving chamber receiving the rotor arm therein.

51. A centrifugal clutch comprising a rotor having a rotor arm, a clutch shoe formed to include pocket means for receiving the rotor arm therein, and a resilient buffer member fixed on the rotor arm to move therewith relative to the clutch shoe and to extend into the pocket means and configured to provide cushion means for cushioning impact between the rotor arm moving in the pocket means to impart centrifugal force to the clutch shoe, the resilient buffer member being formed to include a shallow, open-topped rotor arm-receiving chamber receiving the rotor arm, and the resilient buffer member including a bottom wall having a perimeter edge and a U-shaped upstanding side wall appended to the bottom wall along the perimeter edge and formed to include a rotor arm-receiving opening.

52. A centrifugal clutch comprising a rotor having a rotor arm, a clutch shoe formed to include pocket means for receiving the rotor arm therein, the rotor arm having an axis of rotation, and a resilient buffer member fixed on the rotor arm to move therewith relative to the clutch shoe and to extend into the pocket means and configured to provide cushion means for cushioning impact between the rotor arm moving in the pocket means to impart centrifugal force to the clutch shoe, and wherein each clutch shoe is formed to include three clutch shoe pockets and a resilient buffer member is mounted on the rotor arm lying in each clutch shoe pocket.

53. The centrifugal clutch of claim 52, further comprising a drum containing the clutch shoes, each clutch shoe including a lower wall facing toward the drum and an upper wall facing away from the drum, the lower wall being formed to include one of the three clutch shoe pockets, and the upper wall being formed to include the others of the three clutch shoe pockets.

54. The centrifugal clutch of claim 52, wherein the rotor includes a hub having an axis of rotation, a first set of four rotor arms appended to the hub, and a second set of two rotor arms appended to the hub, the first and second sets are arranged to lie in spaced-apart relation along the axis of rotation of the hub, two of the rotor arms in the first set carry resilient buffer members in clutch shoe pockets formed in a first of the clutch shoes and the other two of the rotor arms in the first set carry resilient buffer members in clutch shoe pockets formed in a second of the clutch shoes, and one of the rotor arms in the second set carries a resilient buffer member in one of the clutch shoe pockets formed in the first of the clutch shoes and another of the rotor arms in the second set carries a resilient buffer member in one of the clutch shoe pockets formed in the second of the clutch shoes.

* * * * *